Jan. 7, 1930.    H. H. HOEVEL    1,742,595
OUTAGE RULE
Filed Feb. 9, 1924
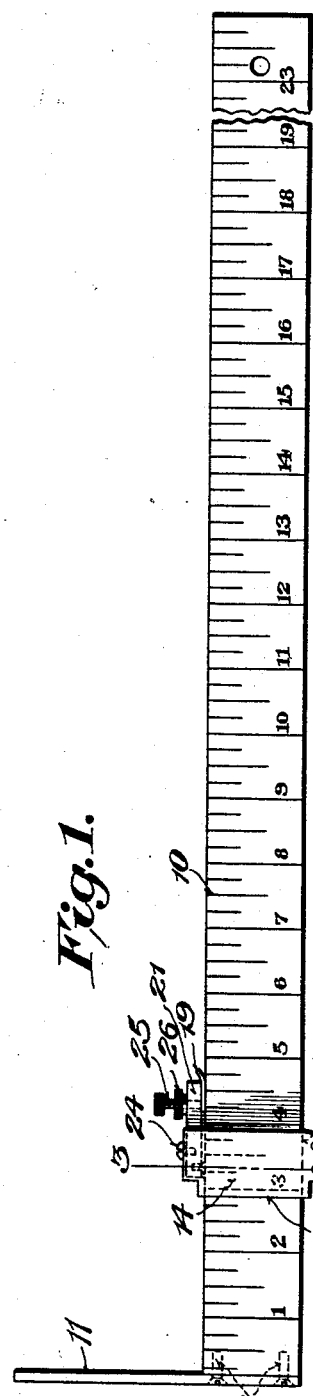
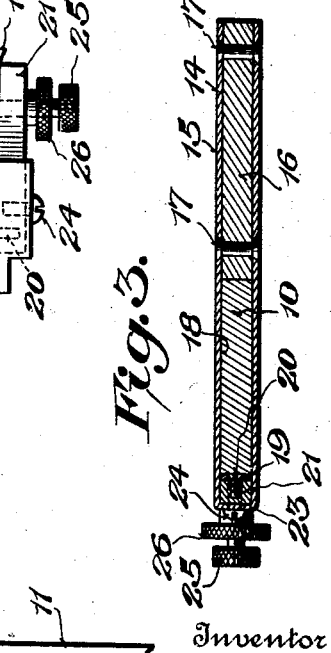
Inventor
Hugo H. Hoevel, Patented Jan. 7, 1930

1,742,595

UNITED STATES PATENT OFFICE

HUGO H. HOEVEL, OF OKLAHOMA CITY, OKLAHOMA

OUTAGE RULE

Application filed February 9, 1924. Serial No. 691,851.

My invention relates to outage rules and particularly to rules of a type that are constructed for use in measuring the outage of tanks carried by tank cars.

Some of the principal objects of my invention are to provide a rule that is simple and inexpensive, and one that may be easily manipulated, so that the outage of a tank may be quickly measured therewith.

The above and other objects and the novel features of my invention will be apparent from the following description taken in connection with the drawing, in which Fig. 1 is a front view, of an outage rule embodying my invention, a part of the rule being broken away;

Fig. 2 is an enlarged rear view of a portion of the rule;

Fig. 3 is a transverse section of the same on an enlarged scale, taken on the line 3—3 of Fig. 1; and Fig. 4 is a view illustrating the application of a rule embodying my invention to the measurement of the outage of a tank.

Referring to the drawing, 10 designates the gage bar or stick of the outrage rule, which is graduated in inches and fractions of an inch, or some other convenient unit of measurement. The bar 10 is rectangular in transverse section, and is preferably of wood, but may, of course, be of some other suitable material, such as metal. The lower or zero end of the bar 10 has an arm 11 of metal or other suitable material secured to it by the screws 12, 12. The arm 11 is rigid and extends laterally perpendicularly of the bar a suitable distance, and, in taking the measurement, is for the purpose of touching the surface of the liquid in the tank. The arm 11 projects from the graduated edge of the bar, which is the upper edge when the rule is held in position to be read, the arm being of such length that it will also serve as a level to position the bar 10 perpendicular to the surface of the liquid.

A slider 14 is frictionally connected to the bar 10 above the arm 11 and projects laterally of the bar 10 in a direction opposite to that of the arm 11, so that it will not be disposed in vertical alignment with the arm 11, and therefore will not obstruct the view of the latter when a measurement is being taken, as will be apparent from an inspection of Figure 4. The slider 14 is wholly disposed intermediate the ends of the bar 10, so that the end of the latter opposite the one carrying the arm 11 may project a distance above the slide and serve as a handle to manipulate the rule.

The slider 14 consists of a sheet metal strip 15 that is doubled upon itself intermediate its ends, the doubled portions being disposed parallel to each other but spaced apart by a block of wood 16 or suitable material that is disposed between the outer ends of the U-shaped strip 15 and secured thereto by rivets 17. The block 16 occupies only a portion of the space between the limbs of the U-shape strip, leaving an opening 18 therebetween through which the bar 10 is slidable.

The bar 10 and slider 14 are slidable relatively to each other in either direction when pressure is applied to either the bar or the slider longitudinally of the bar. The improved construction is such that there will always be sufficient friction between the bar 10 and slider 14, so that the slider will not accidentally move or slide down the bar, due to its own weight, after a measurement has been made. Suitable means may be provided for adjusting or increasing the friction between the bar and slider as the contacting surfaces of these two parts become worn. I provide a suitable device for this purpose which consists of a friction spring 19, preferably a flat resilient strip of metal, one of the flat faces of which engages one edge of the bar 10. The spring 19 is relatively free at one end, which is slightly turned up, and near its opposite end it is secured to the inside of the slider, as by a screw 20 to the inner face of a block 21 of wood or suitable material. The block 21 is disposed between the limbs of the U-shape member 15 and secured to the edge or bent portion 23 thereof by a screw 24. The block 21 and the spring 19 carried by it project along the edge of the bar 10 beyond one edge of the slider. The projecting portion of the block 21 carries an adjusting thumb screw 25 that is threaded through the block and is adapted to engage the spring 19 and press it against the edge of the bar 10 to increase the friction. A knurled lock nut 26 is arranged to lock the screw 25 in any adjusted position.

The utility and operation of the outage rule will be understood from a consideration of the views, especially Figure 4. In the usual form of horizontally disposed cylindrical shell or tank T mounted on a tank car, there is a ledge L within the dome D. The person taking the measurement stands on the tank, preferably on a platform at the point X, near the outer side of the dome adjacent to the portion of the ledge upon which the slider of the rule is to be supported. Suitable means may be provided to cooperate with the graduated bar to indicate the outage in accordance with the relative positions of the slider 14 and arm 11. As shown, the edge 27 of the slider may constitute such indicating means and be the reading edge, and the supporting edge 28 of the slider may be offset from the edge 27 sufficiently to compensate for the thickness of the metal of the ledge, which is the same as that of the tank. Therefore, the measuring edge 27 coincides with the inner surface of the tank when the rule is in measuring position, as shown in Fig. 4.

After the rule has been inserted through the openings O and K and the slider has been set on a fixed abutment or on the ledge L, as shown, the bar 10 is pushed downwardly against the friction between the slider and bar, until the arm 11 touches the surface of the liquid A. Inasmuch as the slider 14 and arm 11 extend from opposite edges of the bar 10, the view of the arm 11 will be unobstructed and a very accurate setting of the rule may be made quickly. After the setting has been made, the rule is removed, the slider in the meantime retaining its set position, because of the frictional connection between these parts, such frictional means automatically acting to bind the slider to the bar 10 in any one of the adjusted positions of the slider along the bar.

After the reading has been made the rule is turned about its longitudinal axis and the reading is compared with a table B on the reverse side of the rule which gives the gallons outage for the particular measurement obtained and for tanks of different capacities. Thus, the gallons outage may be quickly and very accurately determined. In the table illustrated the calculated outages range from ¼ inch to 3 inches dry outage measurement and are for standard cylindrical tanks ranging from 4,231 gallons capacity to 10,000 gallons capacity. It will, of course, be clear that by extending the calculations the table may be enlarged to any desired ranges of outages in inches and capacities of tanks.

The particular outage rule I have disclosed is well adapted for measuring small amounts of outage and the dimensions of the same as shown in Fig. 1, for instance, are substantially one-half full size. However, it is to be understood that the invention is not limited to any particular size or shape of the parts, because these and other features may be modified without departing from the spirit and scope of the invention.

I claim:

1. An outage rule for measuring the outage of tanks and the like, comprising a graduated bar, a member secured to said bar at one end thereof for adjustment to the surface of the contents of a tank, a slider carried by said bar between the ends of the latter and projecting laterally therefrom above and out of vertical alignment with said member whereby a clear view may be had of the latter to enable adjusting it to said surface, said slider comprising means cooperating with the graduated portion of said bar to indicate the outage, said bar with said member thereon being movable relatively to said slider when the latter is set in stationary position in engagement with a fixed abutment on the tank, and means automatically cooperating with said bar and said slider to retain the latter in any one of its adjusted positions.

2. An outage rule for measuring the outage of tanks and the like, comprising a graduated bar, an arm rigidly secured to and projecting perpendicularly from said bar at one end thereof for touching or adjustment to the surface of the contents of a tank, and a slider carried by said bar, said slider being entirely disposed between the ends of said bar and projecting laterally therefrom above and in a direction opposite to said arm whereby said slider is disposed out of vertical alignment with said arm and a clear view may be had of the latter from above to enable adjusting it accurately to said surface, said bar with said arm thereon being movable relatively to said slider when the latter is set in stationary position in engagement with a fixed abutment or part of the tank to make a measurement, and frictional means whereby said slider is automatically retained against accidental displacement from its adjusted position after a measurement, said slider having means cooperating with the graduated portion of said bar to indicate the outage.

3. A rule adapted for inside measurements of tanks and the like comprising a graduated bar having means at one end thereof for adjustment to the surface from which the measurement is to be made, and a slider carried by said bar intermediate the ends thereof and projecting laterally therefrom, said bar with said means being movable relativly to said slider when the latter is set in engagement with a fixed abutment at an opening in the tank, said slider being constructed to be frictionally retained against accidental displacement from its adjusted position after a measurement, and the lower edge of said slider having a portion adapted to engage said abutment and an offset portion adapted to substantially coincide with the inner surface of said tank and also to cooperate with the graduated portion of said bar to indicate the measurement.

4. An outage rule for measuring the outage of tanks and the like, comprising a graduated bar, an arm secured to and projecting perpendicularly from said bar at one end thereof for touching the surface of the contents of a tank, and a slider carried by said bar and projecting laterally therefrom above and out of vertical alignment with said arm whereby a clear view may be had of the latter to enable adjusting it accurately to said surface, said bar with said arm being movable relatively to said slider when the latter is set in position against a wall of said tank to make a measurement, means between said bar and slider cooperating to retain the latter against accidental displacement from its adjusted position on the bar after a measurement, and the lower edge of said slider having a portion adapted to engage the outer surface of the tank wall and also having a portion offset from said first-mentioned portion a distance substantially equal to the thickness of said wall and adapted to cooperate with the graduated portion of said bar to indicate the measurement.

In testimony whereof he affixes his signature.

HUGO H. HOEVEL.